United States Patent [19]

Gött

[11] Patent Number: 4,620,928

[45] Date of Patent: Nov. 4, 1986

[54] PROCESS FOR REDUCING THE HYDROGEN SULFIDE CONTENT IN ANAEROBIC DECOMPOSITION PROCESSES, ESPECIALLY IN SLUDGE DIGESTION PROCESSES

[75] Inventor: Erich Gött, Lahr, Fed. Rep. of Germany

[73] Assignee: Wasserverband Raumschaft Lahr, Fed. Rep. of Germany

[21] Appl. No.: 655,728

[22] Filed: Sep. 28, 1984

[30] Foreign Application Priority Data

Sep. 29, 1983 [DE] Fed. Rep. of Germany ....... 3335265

[51] Int. Cl.$^4$ ............................. C02F 3/28; C12P 5/02
[52] U.S. Cl. ..................... 210/603; 210/613; 435/167; 48/197 A
[58] Field of Search ............... 210/603, 605, 630, 218, 210/916, 614, 96.1, 612, 613; 48/197 A; 435/167, 801

[56] References Cited

U.S. PATENT DOCUMENTS 3,705,098 12/1972 Alexander et al. ................ 210/916
4,022,665 5/1977 Ghosh et al. ....................... 210/603
4,213,857 7/1980 Ishida et al. ....................... 210/603

FOREIGN PATENT DOCUMENTS 1584980 4/1970 Fed. Rep. of Germany .
2805054 3/1984 Fed. Rep. of Germany .
55-88896 7/1980 Japan ................................... 210/603
58-74190 5/1983 Japan ................................... 210/603
58-74191 5/1983 Japan ................................... 210/603

OTHER PUBLICATIONS

Munchner Beitrage zur Abwasser-, Fischerei- und Flussbiologie, vol. 3, 1956.

Primary Examiner—Benoit Castel
Attorney, Agent, or Firm—Keil & Weinkauf

[57] ABSTRACT

A process for the anaerobic digestion of sludge or for the anaerobic decomposition of organically contaminated waste waters while obtaining fermentation gas containing methane as the main component, wherein a sufficient quantity of air or oxygen is added to the digestion process together with the crude sludge or the waste water whereby a residual oxygen content of 0.01 to 3.0% by volume, preferably 0.1 to 1.5% by volume is obtained in the formed sewage gas.

5 Claims, No Drawings

PROCESS FOR REDUCING THE HYDROGEN SULFIDE CONTENT IN ANAEROBIC DECOMPOSITION PROCESSES, ESPECIALLY IN SLUDGE DIGESTION PROCESSES

The present invention relates to a process for the reduction of the hydrogen sulfide ($H_2S$) content of fermentation gases or biogas obtained in anaerobic biological processes. More particularly, the invention relates to the reduction of hydrogen sulfide content in sewage gases obtained in digestion towers of sewage treatment plants.

During digestion processes in sludge digestion chambers, methane fermentation is conducted in order to make possible use of the recovered sewage gases.

The decomposition of organic substances in sewage sludge takes place in three phases. In the first (anaerobic) phase, substances of high molecular weight are converted into organic acids, predominantly lower fatty acids which, in the second (anaerobic) phase, by means of acetogenic bacteria, are converted into acetic acid, carbon dioxide ($CO_2$) and hydrogen ($H_2$). In the third (anaerobic) phase, carbon dioxide and methane ($CH_4$) are formed from these products by means of methanogenic bacteria. Therefore, the digestion process takes place partly in an acidic and partly in an alkaline medium.

The quantity of the recoverable sewage gas depends on various factors, such as the proportion of the organic substances in the crude or fresh sludge, the temperature in the digestion chamber, the mixing of fresh with digested sludge, and finally the proportion of industrial waste in the fresh sludge that may contain substances which inhibit digestion.

According to the condition of the sludge and the operation of the digestion tank, the following compositions may occur in the case of heated digestion chambers working with a medium charge:

| | |
|---|---|
| methane | 58–72% |
| carbon dioxide | 32–37% |
| nitrogen | 0–0.2% |
| hydrogen | 0–0.2% |
| hydrogen sulfide | 0–0.1% |

If waste water and/or sewage to be treated contains sulfur compounds, especially sulfates, their content also rises in the sewage sludge to be digested. The sulfur compounds in the sewage sludge are decomposed to form hydrogen sulfide by bacterial activity so that with an increasing content of sulfur compounds in the sludge, the content of hydrogen sulfide in the sewage gas increased also. Hydrogen sulfide has an acute toxicity and, beginning at concentrations of 200 mg sulfur per liter, has a toxic effect on the bacteria population. In addition, hydrogen sulfide has a very corrosive effect on digestion towers and connected facilities. When it is used in gas motors or for heating purposes, certain tolerance values must therefore not be exceeded.

For this reason, desulfurizing facilities have been provided for reducing the hydrogen sulfide content of sewage gases. Apart from the resulting higher cost and the required additional apparatus, the corrosive effect of the formed hydrogen sulfide in the digestion tower and in the directly connected apparatus is not eliminated by such desulfurizing of the sewage gas.

It is an object of the invention to provide a process for anaerobic sludge digestion or for anaerobic decomposition of organicially contaminated waste water, where even in the case of an increased content of sulfur compounds in the crude sludge or waste water, a substantially hydrogen sulfide-free fermentation gas is obtained.

This object is achieved by a process for anaerobic sludge digestion or anaerobic decomposition of organically contaminated waste water whereby fermentation gas containing methane as the main component is obtained. This process is characterized by the fact that together with the crude sludge or waste water, such a quantity of oxygen is charged that in the forming fermentation gas a residual oxygen content of 0.01 to 3.0 percent by volume, preferably 0.1 to 1.5 percent by volume, is contained therein. Especially preferable is a content of 0.5 to 1.5 percent by volume or 0.1 to 0.8 percent by volume residual oxygen. Preferably the oxygen is charged in the form of air.

Very surprisingly, it has been found that the presence of small quantities of oxygen does not impair the anaerobic decomposition process where the organic substance is decomposed to form carbon dioxide and methane, but that also in the case of high content of sulfur compounds, especially sulfates, in the sludge or in the waste water, the formation of hydrogen sulfide is prevented.

The organic sulfur-containing compounds include sulfurous natural substances, proteins and metabolic products, such as occur in slaughterhouses and agricultural operations, in distilleries and yeast-cultivating plants, as well as organic sulfur-containing compounds such as are contained in waste waters of chemical industries, especially in the production of pharmaceutical agents, pesticides, dyes and petrochemical products. Inorganic sulfur-containing compounds, for example, include sulfates.

The thickened crude sludge resulting from the aerobic treatment phase, according to the composition of the waste or sewage water to be treated, contains organic substances from which, per kilogram, about 490 to 500 liters of sewage gas can be obtained by means of anaerobic digestion.

Decomposition of the organic substances occurs, in the absence of stabilization, with pH reduction so that, for the stabilization and for maintaining pH at 7 to 7.2 which is optimal for methane formation, a periodic addition of alkali to the digesting sludge is required. Suitable alkalis include lime, alkali metal hydroxides e.g. sodium hydroxide and potassium hydroxide. In the case of high contents of sulfur-containing compounds, especially of sulfates, in industrial waste waters, which may reach up to 40,000 ppm, hydrogen sulfide is created under the conditions of mesophilic digestion, at 30° to 35° C., by means of the effect of the bacteria.

Also the presence of bacteria that can convert hydrogen sulfide into elemental sulfur does not, to a sufficient extent, prevent the formation of hydrogen sulfide under digestion conditions. The presence of bacteria, such as the colorless beggiatoa, thiotrix, thionema and the red sulfur bacteria, is, on the other hand, an indication of the fact that under the conditions of digestion, considerable quantities of hydrogen sulfide are produced.

The invention and its preferred embodiments will be described in further detail by the following non-limiting examples. In the examples, the term "communal sewage treatment plant" refers to a plant wherein one or both of sewage and waste water are treated.

EXAMPLE 1

(Prior Art)

In a communal sewage treatment plant wherein sewage was treated in two connected anaerobically operated digestion towers, the composition of the sewage gas obtained from both towers was examined at periodic intervals, and the composition shown in Table 1 was found in long-time samples:

TABLE 1

| Component | % by Volume |
|---|---|
| Carbon Dioxide | 35.5–35.9 |
| Oxygen | 0 |
| Carbon monoxide | 0 |
| Nitrogen (approximately) | 0.2 |
| Hydrogen | 0.1–0.2 |
| Methane | 63.5–64.5 |

The hydrogen sulfide content was 312 mg per cubic meter of sewage gas. During changes of the composition of the waste water, the value was increased to 800–850 mg per cubic meter. An analysis of the gas coming from the second digestion tower resulted in hydrogen sufide contents of 3,000 to 4,000 mg per cubic meter, so that in corresponding short samples, contents of above 1,000 mg hydrogen sulfide per cubic meter were found in the overall gas. The increase in hydrogen sulfide content in the sewage gas as compared to previous long-time observations could clearly be based on a higher sulfate content of the waste water.

EXAMPLE 2

In accordance with the invention, together with the continuously fed sludge, up to 30 liters of air per kilogram of organic solids were fed into both digestion towers as in Example 1, the first tower receiving a smaller quantity of air than the second tower. Tower I continuously received 60 to 70 cubic meters of crude sludge in one day's time, in which case, based on the size of the plant and the discharge quantity, an average retention time of about 30 days in Tower I was maintained. In Tower II, to complete the digestion, a median retention time of 15 days was set. By admitting crude sludge, during introduction into the digestion process according to the invention, in such a quantity that, while taking into account the respective decomposable quantity of the organic solid substances in the fed sludge, a residual oxygen content of 0.5% by volume remained in the sewage gas, the anaerobic fermentation sequence, while decomposing the organic substances to form carbon dioxide and methane, took place in the conventional manner, without the sulfates or other sulfur-containing compounds being converted into undesirable nascent hydrogen sulfide gas, even if it was a sludge having a high sulfate or other sulfur content. After adjustment to stable operating conditions, the analysis values of the gas were measured and are shown in Table 2A.

TABLE 2A

| Component | Tower I 1st Value | Tower I 2nd Value | Tower II |
|---|---|---|---|
| Carbon dioxide* | 35.5 | 34.0 | 31.5 |
| Methane* | 63.2 | 64.2 | 62.0 |
| Oxygen* | 0.0 | 0.0 | 0.5 |
| Residual* | 1.2 | 1.8 | 6.0 |
| Hydrogen sulfide** | 170 | 180 | Trace |

*% by volume
**mg/cubic meter

Within the framework of the test sequence, tower II, in addition to the sludge, directly received sulfate-containing waste water having a total sulfate content of 14 kg/cubic meter and the tower contents were circulated and mixed. The gas from tower II was tested continously and the results obtained are shown in the following Table 2B.

TABLE 2B (Tower II)

| Component | 10:30 | 10:50 | 11:00 | 11:30 | 12:00 | 12:30 | 13:00 |
|---|---|---|---|---|---|---|---|
| Carbon Dioxide* | 30.5 | 30.3 | 30.3 | 30.8 | 31.0 | 31.0 | 30.5 |
| Methane* | 62.0 | 62.5 | 62.3 | 61.0 | 60.0 | 60.0 | 59.0 |
| Oxygen* | 0.4 | 0.3 | 0.3 | 0.4 | 0.5 | 0.5 | 0.5 |
| Residual* | 7.1 | 6.9 | 7.1 | 7.8 | 8.5 | 8.5 | 10.1 |
| Hydrogen sulfide** | 130 | 140 | 123 | 118 | 105 | 110 | 85 |

*% by volume
**mg/cubic meter

EXAMPLE 3

(Comparison)

For purposes of comparison, a control sequence was carried out in apparatus as in Examples 1 and 2, during which the oxygen supply was interrupted and no waste water that was considerably contaminated with sulfate was added, so that the sulfate load in the crude sludge was within the range of the usual long-time concentration of this sewage treatment plant. However, it must be taken into consideration here that the sewage treatment plant continuously received waste waters loaded with sulfates or other sulfur-containing compounds via the communal system. When the gas was tested in regard to quality and hydrogen sulfide content, the analysis values shown in the following Table 3 were obtained.

TABLE 3

| Component | Tower I 1st value | Tower I 2nd value | Tower II 1st Value | Tower II 2nd Value |
|---|---|---|---|---|
| Carbon Dioxide* | 37.5 | 37.8 | 28.2 | 28.0 |
| Methane* | 62.3 | 62.0 | 71.5 | 71.8 |
| Oxygen* | 0 | 0 | 0 | 0 |
| Residual* | 0.2 | 0.2 | 0.2 | 0.2 |
| Hydrogen sulfide** | 255 | 270 | 830 | 810 |

*% by volume
**mg/cubic meter

In the above Table 3, the residual volume consists predominantly of nitrogen.

A comparison of Examples 2 and 3 shows that by means of feeding small amounts of oxygen in the form of air according to the invention, the hydrogen sulfide content in the sewage gas decreases clearly in a composition which otherwise remained substantially constant.

EXAMPLE 4

A semi-industrial test digestion tower was charged only with solids-free organically contaminated waste water having a sulfur content of 750 mg per liter resulting from organic (such as methionine, cystine) and inorganic (such as sulfates) sulfur-containing compounds. There was, in the case of an overall charge of 3 kg CSB/(cubic meter digestion tank×d), the composition of the formed fermentation gas is shown in the following Table 4.

By adding 0.9 liters of air per hour or 0.2 liters of oxygen per hour to the anaerobic process, the hydrogen sulfide content of the fermentation gas was within a few hours reduced to less than a detectable amount. The hydrogen sulfide content of the fermentation gas, when the continuous air supply remained the same, also when additional sulfur-containing compounds were added of the magnitude as in Example 2, remained below the detection limit. For the formed fermentation gas, the quantity of which increased slightly when air or oxygen was supplied, the composition also shown in Table 4 was obtained.

TABLE 4

| Component | % by volume | |
| --- | --- | --- |
| | No air | Air added |
| Carbon dioxide | 36.4 | 36.5 |
| Oxygen | 0.005 | 0.15 |
| Carbon monoxide | n.n** | n.n** |
| Nitrogen | 1.1 | 5.2 |
| Hydrogen | 0.006 | 0.005 |
| Methane | 62.3 | 58.1 |
| Hydrogen sulfide | 1,900* | n.n** |

*mg/cubic meter
**n.n = not detectable

This example shows that by feeding air or oxygen according to the invention, hydrogen sulfide formation is decreased significantly even in the case of anaerobic decomposition of waste waters containing organic and inorganic sulfur-containing compounds. It is especially advantageous to feed the air or the oxygen via a feeding device, for example according to the Venturi principle, directly to the sludge or the fed waste water, the quantity of air or oxygen being controlled by a control valve.

For reasons of safety, when carrying out the process according to the invention, the anaerobic system, such as the digestion tower, may be equipped with devices for the continuous determination of methane content, of hydrogen sulfide content and of oxygen content in the fermentation gas. By means of corresponding control devices, a content of up to 3% by volume of oxygen in the fermentation gas is set by control of the air or oxygen supply, and by progamming a safety circuit, an alarm is triggered at an oxygen content of, for example, 1.5% by vol. in order to interrupt additional supply of air or oxygen into the digestion tower. In an analogous manner, the air or oxygen supply to connected second or further digestion towers, is controlled, where also in this case, the supply takes place preferably by input into the feeding pipe by means of an injector according to the Venturi principle. In principle, it is also possible to apportion the air or oxygen directly into the digestion tower.

By means of the method of carrying out the anaerobic decomposition process, preferably a sludge digestion process, according to the invention, hydrogen sulfide content in the fermentation gas is lowered to such an extent that even in the case of a high content of sulfur-containing compounds, especially a high sulfate content, of the sludge or the waste water, separate desulfurizing can be eliminated and the fermentation gas, without further purification, can be used conventionally. The process according to the invention has the special advantage that, by reducing the formation of free hydrogen sulfide in the digestion tower, corrosion therein and in connected facilities is considerably reduced. In addition, the danger that the digestion process is harmed by the toxic effect of the hydrogen sulfide is eliminated. It was also found that the tendency toward lowering pH is less during the digestion process so that less alkali is required in order to maintain the required alkaline phase for the decomposition of the organic substances to form carbon dioxide and methane.

By means of the process according to the invention, anaerobic decomposition processes, especially sludge digestion processes, can therefore be carried out advantageously, in which case the process is suitable not only for digestion towers, but also for control of bacteriological anaerobic changes in long flow paths of sludges and waste waters, if there is a danger of hydrogen sulfide formation by anaerobic decomposition processes. There can be used in addition to the ideal mixing digestion tower, digestion towers with sludge recycling, or an anaerobic filter or upflow anaerobic sludge blanket process.

What is claimed is:

1. In a process for the anaerobic decomposition of sewage sludge, organically contaminated waste water or mixture thereof to form a fermentation gas containing methane as the primary component, the improvement which comprises: reducing the amount of hydrogen sulfide formed in the process by adding to the material to be anaerobically decomposed a sufficient amount of oxygen whereby the gas produced during the decomposition contains a residual oxygen content of 0.01 to 3.0% by volume.

2. The process according to claim 1 wherein the oxygen is added in the form of air.

3. The process according to claim 1 wherein the gas produced has a residual oxygen content of 0.1 to 1.5% by volume.

4. The process according to claim 1 wherein the gas produced has a residual oxygen content of 0.1 to 0.8% by volume.

5. The process of claim 1, wherein the decomposition is conducted in two phases, and wherein, as the material from the first phase is passed to the second phase, a sufficient amount of oxygen is added whereby the gas produced in the second phase has a residual oxygen content of 0.01 to 3.0% by volume.

* * * * *